US00RE40357E

(19) United States
(12) Reissued Patent
Geyer

(10) Patent Number: US RE40,357 E
(45) Date of Reissued Patent: Jun. 3, 2008

(54) HIGH STRENGTH PLASTIC BAG

(75) Inventor: Thomas E. Geyer, Cincinnati, OH (US)

(73) Assignee: Ampac Plastics LLC, Cincinnati, OH (US)

(21) Appl. No.: 11/011,025

(22) Filed: Dec. 13, 2004

Related U.S. Patent Documents

Reissue of:
(64) Patent No.: 6,702,460
Issued: Mar. 9, 2004
Appl. No.: 10/104,691
Filed: Mar. 22, 2002

(51) Int. Cl.
*B65D 33/14* (2006.01)
*B65D 33/08* (2006.01)
*B65D 33/24* (2006.01)

(52) U.S. Cl. ..... 383/5; 383/10; 383/84
(58) Field of Classification Search ..... 383/5, 383/10, 17, 84, 78, 66
See application file for complete search history.

(56) References Cited

U.S. PATENT DOCUMENTS 5,908,243 A 6/1999 Hanning
6,190,043 B1 2/2001 Diplock
6,196,716 B1 3/2001 Geyer
6,431,752 B1 8/2002 Diplock

FOREIGN PATENT DOCUMENTS

| | | |
|---|---|---|
| EP | 0 430 558 | 2/1994 |
| GB | 2 238 291 | 5/1991 |
| GB | 2 238 292 | 5/1991 |
| GB | 2 250 011 | 5/1992 |

OTHER PUBLICATIONS

Sample and photographs of plastic retail security bag, first produced circa 1999–2000.*

* cited by examiner

*Primary Examiner*—Jes F. Pascua
(74) *Attorney, Agent, or Firm*—Wood, Herron & Evans, LLP

(57) ABSTRACT

A high strength plastic bag is formed from two sheets of polymeric material. The sheets are folded, machined, and heat sealed to form a receptacle portion, a flap for covering an opening to the receptacle portion, and a handle having three layers of polymeric material for improved strength. The bag includes a tamper-indicating closure and has a high friction coefficient to prevent sliding of stacked bags.

9 Claims, 2 Drawing Sheets

HIGH STRENGTH PLASTIC BAG

Matter enclosed in heavy brackets [ ] appears in the original patent but forms no part of this reissue specification; matter printed in italics indicates the additions made by reissue.

FIELD OF THE INVENTION

This invention relates to plastic bags, and more particularly to a high strength plastic bag.

BACKGROUND OF THE INVENTION

Plastic bags have been widely used to contain various articles. Such plastic bags include tamper-indicating bags, which have been used to secure sensitive or valuable items during transit. These tamper-indicating bags have often been used to transfer money in the form of paper money, checks, or coins. The use of plastic bags to transfer coins presents several problems, however. For example, when plastic bags are used to accommodate more than a small number of coins, the bags need to be strong so they do not rupture under the weight of the coins. To make carrying the bag easier, the plastic bags require a means for grasping the bag. Prior plastic bags having handles to permit a user to grasp the bags are limited with respect to the amount of coins which may be contained in the bag because the heavy weight of a large number of coins tends to tear the bag at the handle. Furthermore, conventional plastic bags are susceptible to sliding against one another, making it difficult to stack the bags atop one another.

There is thus a need for a high strength plastic bag which may be used to contain and transport coins, and which overcomes the drawbacks of prior art plastic bags.

SUMMARY OF THE INVENTION

The present invention provides a high strength plastic bag which may be used to contain and carry heavy items, such as coins. The bag is formed from two sheets of polymeric material which have been, folded, die stamped, and heat sealed to create a receptacle portion, a handle portion, and a flap portion. The handle portion of the bag includes an aperture which permits a user to grasp the bag and comprises three sheets of high strength polymeric material that have been joined with heat seals to provide added strength to the handle.

The flap portion of the bag covers an opening to the receptacle and may be sealed over the opening with a tamper-evident adhesive to secure the bag. In one aspect of the invention, the flap portion further includes a removable receipt which may be detached from the bag for record keeping purposes. In another aspect of the invention, a second removable receipt is formed on the handle portion of the bag.

In yet another aspect of the invention, the bag is formed from polymeric material having a high friction coefficient so that the bags may be stacked atop one another without slipping.

The features and objectives of the present invention will become more readily apparent from the following Detailed Description taken in conjunction with the accompanying drawings.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

DETAILED DESCRIPTION

Figure 1:
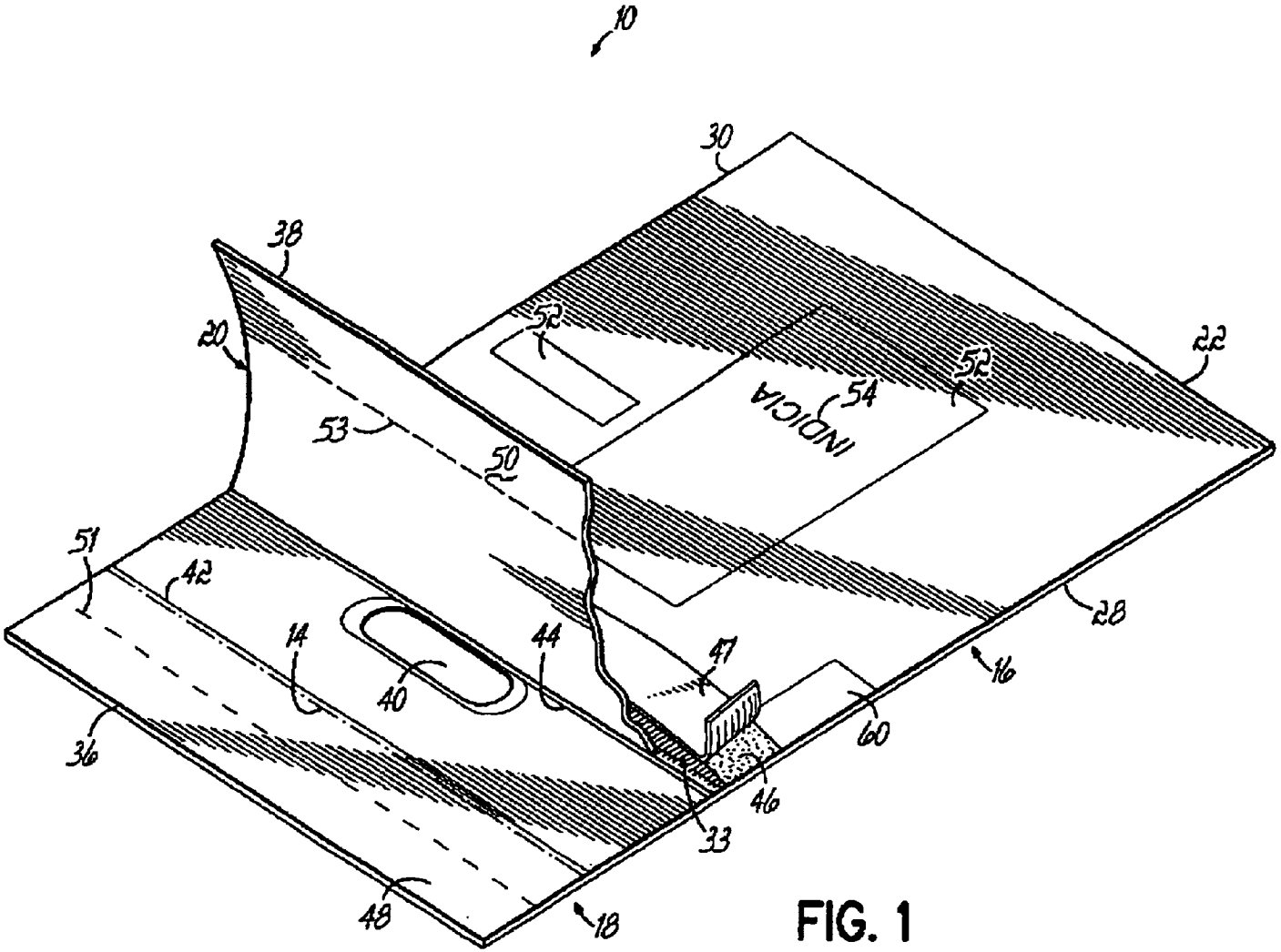
FIG. 1 is a perspective view of an exemplary plastic bag of the present invention.
Figure 2:
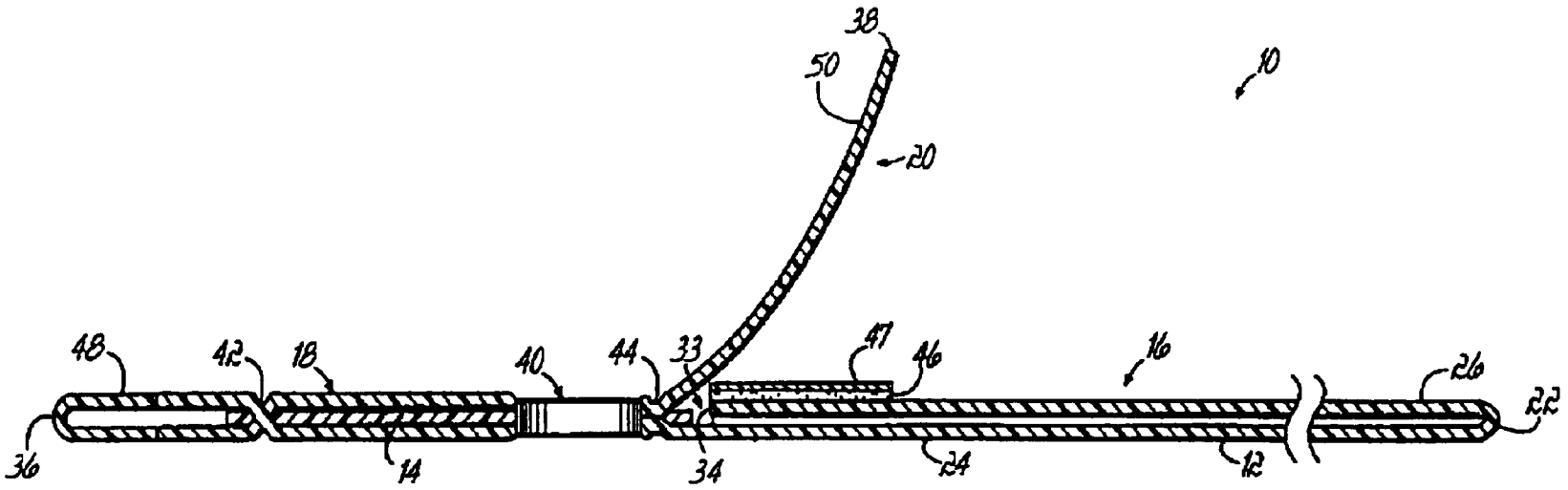
FIG. 2 is a cross-section of the bag shown in FIG. 1, taken along lines 2-2.
Figure 3:
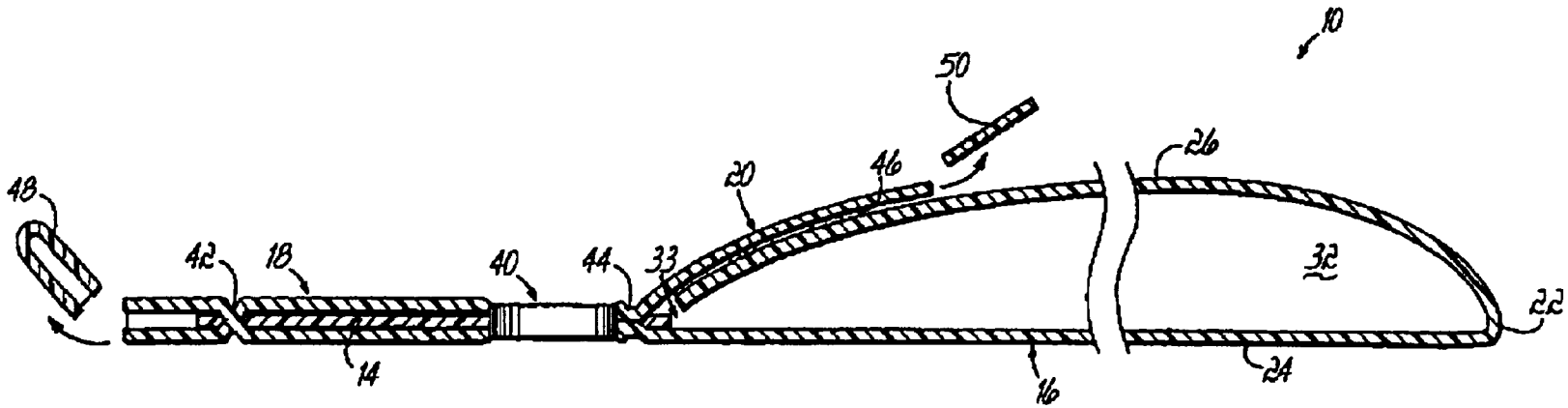
FIG. 3 is a cross-section of the bag of FIG. 2, depicting the bag in a sealed condition with first and second receipts detached from the bag.

Referring to FIGS. 1-3, there is shown an exemplary plastic bag 10 of the present invention. The plastic bag 10 is formed from two sheets of plastic material 12, 14. The first sheet 12 is folded in an overlapping manner and heat sealed to form an interior compartment. First sheet 12 is also folded together with the second sheet 14 to form a handle for carrying the bag 10. As formed, the bag 10 includes a receptacle portion 16, a handle portion 18, and a flap portion 20. The receptacle portion 16 of the bag 10 is formed by folding the first sheet 12 over itself to form a first folded edge 22 and first and second overlapping layers 24, 26. When the side edges 28, 30 of the folded sheet are heat sealed, the first and second layers 24, 26 of the first sheet 12 form a compartment 32 defined by the sealed edges 28, 30 and the first folded edge 22. The interior of the compartment 32 may be accessed by an opening 33 created by the unsealed free edge 34 of the second layer 26.

The handle and flap portions 18, 20 of the bag 10 are formed by folding the first layer 24 of the first sheet 12 back over itself to create a second folded edge 36 whereby the free edge 38 of the first layer 24 extends beyond the free edge 34 of the second layer 26. The second plastic sheet 14 is inserted between the folds of the first layer 24 of the first sheet 12 so that at least part of the handle portion 18 comprises three layers of plastic. The handle portion 18 further includes an aperture 40 formed through the three layers of the handle portion 18 at a distance from an end of the bag 10. In an exemplary embodiment, the aperture 40 is formed a distance of approximately 2½ to 4 inches from an end of the bag 10. In another exemplary embodiment, the aperture 40 is formed at least approximately 3 inches from an end of the bag 10. The aperture 40 is surrounded by a heat seal around its perimeter. Upper and lower heat seals 42, 44 above and below the aperture 40 join the three layers of plastic material.

The second sheet 14 of the handle is a polymeric sheet which has been developed for strength and heat sealability. It can be formed from standard polyolefins, blends or coextrusions. In an exemplary embodiment, the second sheet has inner and outer layers formed from a blend of linear low density ethylene and metalocene and a stiffening middle layer, such as high density polyethylene (HDPE).

The flap portion 20 extends over the opening 33 formed by the free edge 34 of the second layer 26 of the first sheet 12 to form a closure for the bag. In the exemplary embodiment shown, the bag 10 is provided with an adhesive 46 applied to the second layer 26 of the first sheet 12 near the opening 33 created by the free edge 34, whereby the flap 20 may be bonded to the second layer 26 to seal the bag 10. A release liner 47 may be provided over the adhesive 46 to protect the adhesive 46 from contamination and to prevent premature bonding prior to sealing the bag 10. In an exemplary embodiment, the adhesive 46 is a tamper-indicating adhesive and the bag 10 is printed with tamper-indicating ink near the opening 33, as described more fully in U.S. Pat. No. 6,196,716 to Geyer, herein incorporated by reference in its entirety. After the bag 10 is sealed as described above, the tamper-indicating adhesive 46 provides an indication of when the flap portion 20 has been opened the first time. In this manner, the plastic bag 10 provides a secure means for containing sensitive or valuable items.

The plastic bag 10 further includes one or more receipt portions 48, 50 which may be removed from the bag 10 for record keeping purposes. In the exemplary embodiment shown, the bag 10 includes two receipt portions 48, 50 which may be removed from the bag 10. A first receipt portion 48 is removably attached to the handle portion 18 of the bag 10, and a second receipt portion 50 is removably attached to the flap portion 20 of the bag 10. In the exemplary embodiment, the receipt portions 48, 50 are formed by perforations 51, 53 formed on the bag 10 a distance from the edges 36, 38 of the handle and flap portions 18, 20 to create a removable strip of plastic material. Ink or other visible material may be applied to the bag 10 to create viewable areas 52 for marking the bag 10 with indicia 54. Such markable areas 52 are particularly useful on the receptacle and receipt portions 16, 48, 50, but may be applied to any portion of the bag 10 as desired.

A high strength plastic bag 10 as described above may be formed from two sheets of plastic material 12, 14 according to the following exemplary method. The first sheet 12 of polymeric material is folded to form a first folded edge 22 and first and second overlapping layers 24, 26 whereby the first layer 24 extends beyond a free edge 34 of the second layer 26. A second sheet 14 of polymeric material is positioned on a portion of the first layer 24 of the first sheet 12, at a distance from the free edge 34 of the second layer 26. The first layer 24 of the first sheet 12 is folded over the second sheet 14 and a portion of the second layer 26 of the first sheet 12 to sandwich the second sheet 14 between the folds of the first layer 24, forming a second folded edge 36 and a flap 20 which covers the free edge 34 of the second layer 26.

The first and second side edges 28, 30 of the first folded sheet 12 are heat sealed to define an interior compartments 32 between the first and second overlapping layers 24, 26 of the first sheet 12 and an opening 33 to the interior compartment 32 at the free edge 34 of the second layer 26. The first sheet 12 of polymeric material is perforated near the second folded edge 36 to define a first removable receipt 48. The first sheet 12 of polymeric material is perforated near the edge 38 of the flap 20 to define a second removable receipt 50. An aperture 40 is formed through the folds to the first layer 24 of the first sheet 12 and through the second sheet 14 sandwiched between the folds of the first sheet 12, at a distance of at least three inches from the perforation defining the first removable receipt 48. The first and second sheets 12, 14 are heat sealed around the perimeter of the aperture 40 and at locations 42, 44 above and below the aperture 40.

Indicia 54 may be printed on any portion of the plastic bag 10 either before or after formation of the bag 10. In an exemplary embodiment, ink 60 is applied to portions of the first sheet 12 near the side edges 28, 30 and the opening 33 formed by the free edge 34 of the second layer 26 of the first sheet 12. The ink 60 applied in these areas prevents the flap portion 20 of the bag 10 from sealing against the bag 10 when the bag 10 is machined.

While the present invention has been illustrated by the description of the various embodiments thereof, and while the embodiments have been described in considerable detail, it is not intended to restrict or in anyway limit the scope of the appended claims to such detail. Additional advantages and modifications will readily appear to those skilled in the art. The invention in its broader aspects is therefore not limited to the specific details, representative apparats and methods and illustrative examples shown and described. Accordingly, departures may be made from such details without departing from the scope or spirit of applicant's general inventive concept.

What is claimed is:

1. A plastic bag having a high strength handle, comprising:

a receptacle portion having first and second opposing walls, said first and second walls joined substantially around the perimeters of said walls to define an interior cavity for receiving articles and an opening permitting access to said interior cavity;

a handle portion having an aperture whereby user may grasp said handle portion;

a flap portion integral with said receptacle portion and proximate said opening, said flap portion extending over said opening to form a closure for said opening;

said handle portion further comprising first and second outer plastic layers and an interior plastic layer sandwiched between said first and second outer layers;

upper and lower lateral heat seals above and below said aperture, respectively, and a heat seal around said aperture;

a tamper-indicating adhesive disposed on said receptacle portion proximate said opening to bond said flap portion over said opening to seal the bag;

a first receipt portion frangibly attached to said handle portion above said heat seal; and a second receipt portion frangibly attached to said flap portion and having a printed area.

2. The bag of claim 1 wherein said handle portion is located at a distal end of said bag and said aperture is located at least approximately 3 inches inboard of said end of said bag.

3. The bag of claim 1 wherein said first receipt is a discrete strip of material formed by perforating the bag proximate a distal end of said bag.

4. The bag of claim 1 wherein said second receipt is a discrete strip of material formed by perforating the bag proximate a distal end of said flap portion.

5. The bag of claim 1 wherein the entire bag is formed from two sheets of polymeric material which are folded, die cut, and heat sealed to form said individual receptacle, handle, flap, and receipt portions.

*6. A plastic bag, comprising:*

*a receptacle portion having first and second opposing walls, said first and second walls joined substantially around the perimeters of said walls to define an interior cavity for receiving articles and an opening permitting access to said interior cavity;*

*a handle portion having an aperture whereby user may grasp said handle portion;*

*a flap portion integral with said receptacle portion and proximate said opening, said flap portion extending over said opening to form a closure for said opening;*

*upper and lower lateral heat seals above and below said aperture, respectively, and a heat seal around said aperture;*

*a tamper-indicating adhesive disposed on said receptacle portion proximate said opening to bond said flap portion over said opening to seal the bag;*

*a first receipt portion frangibly attached to said handle portion above said heat seal; and*

*a second receipt portion frangibly attached to said flap portion and having a printed area.*

*7. The plastic bag of claim 6, wherein said handle portion comprises a plurality of thermoplastic layers heat sealed together around said aperture.*

*8. The plastic bag of claim 6, wherein said aperture is located approximately 3 inches inboard from a distal end of the bag.*

*9. A plastic bag, comprising:*

*a receptacle portion having first and second opposing walls, said first and second walls joined substantially around the perimeters of said walls to define an interior cavity for receiving articles and an opening permitting access to said interior cavity;*

*a handle portion having an aperture whereby user may grasp said handle portion;*

*a flap portion integral with said receptacle portion and proximate said opening, said flap portion extending over said opening to form a closure for said opening;*

*said handle portion further comprising first and second outer plastic layers and an interior plastic layer sandwiched between said first and second outer layers;*

*said interior plastic layer of said handle portion including outer layers formed from linear low-density ethylene and metalocene, and a central layer formed from high density polyethylene;*

*upper and lower lateral heat seals above and below said aperture, respectively, and a heat seal around said aperture;*

*a tamper-indicating adhesive disposed on said receptacle portion proximate said opening to bond said flap portion over said opening to seal the bag; and*

*a receipt portion frangibly attached to one of said handle portion or said flap portion.*

* * * * *